Patented May 31, 1932

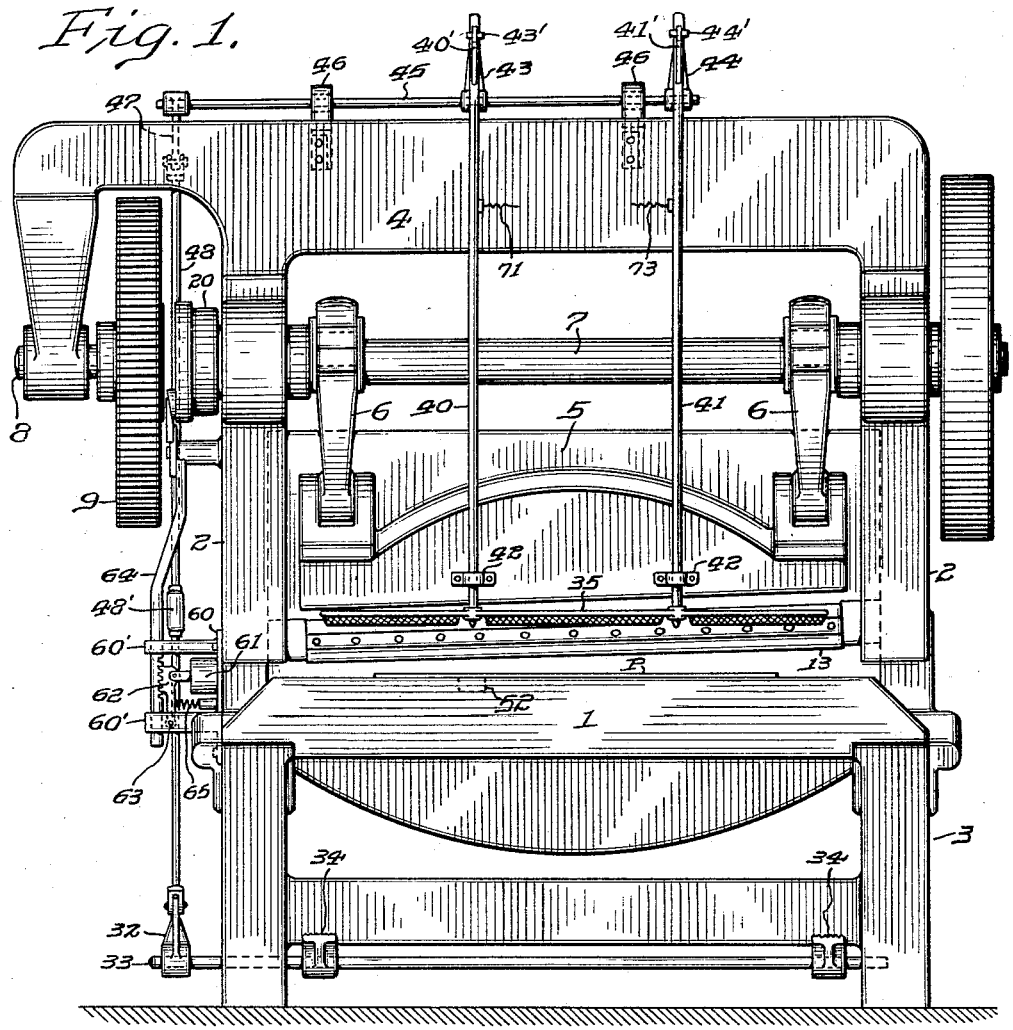

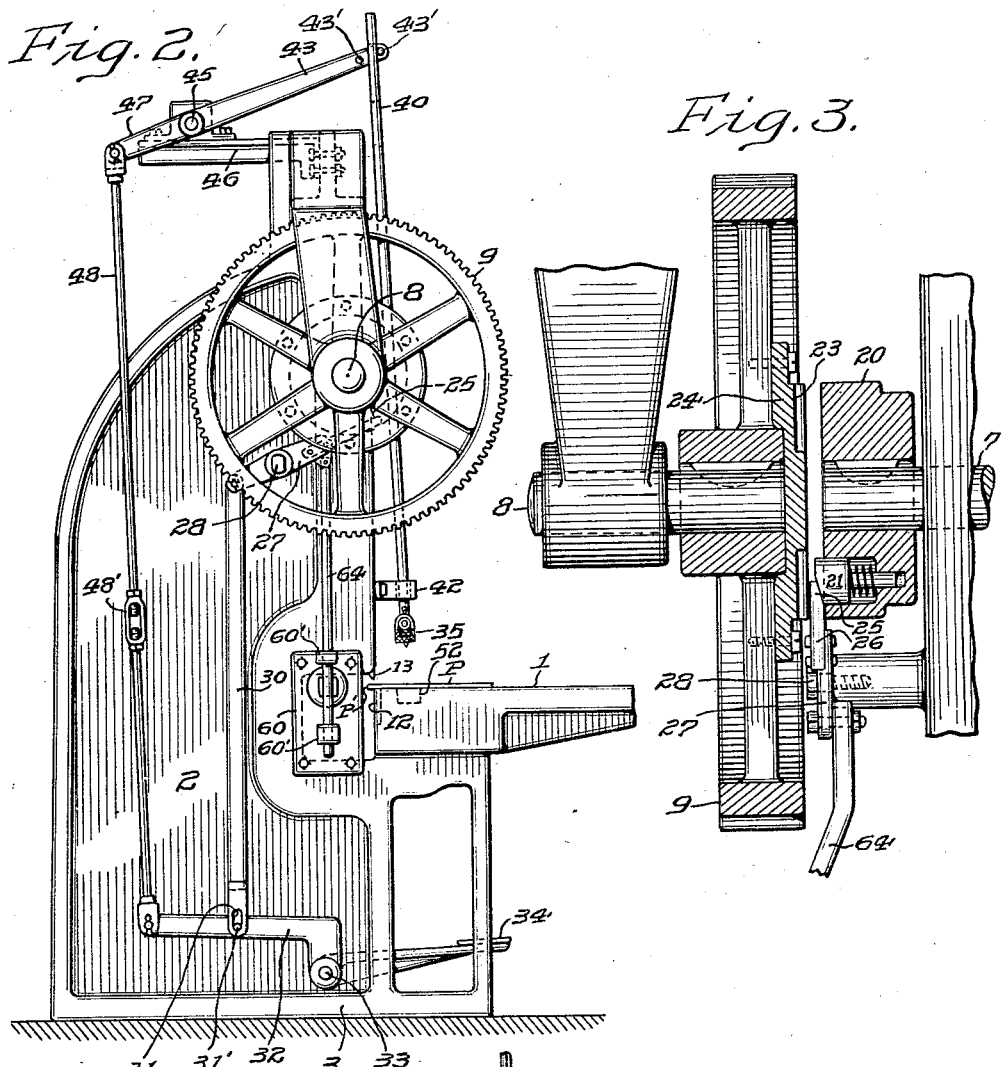

1,860,991

UNITED STATES PATENT OFFICE

CHARLES CARROLL, OF EAST CHICAGO, AND JESSIE SHERMAN HOGUE, OF HAMMOND, INDIANA

SAFETY DEVICE FOR SHEARING OR PUNCHING MACHINES OR THE LIKE

Application filed June 2, 1928. Serial No. 282,428.

Among the objects of our invention are to provide a safety device or mechanism suitable for operative association and combination with a machine such as a shear, punch or the like embodying a movable head carrying a blade or other shearing, cutting or punching tool, said device comprising means adapted to strike the operator's hands if they are advanced too closely to the tool carrying head before the latter can be set in motion to thereby warn the operator of his danger and which, furthermore, is operative under such conditions to prevent the head from being set in motion until the operator's hands are withdrawn to a position of safety.

A further object of the invention is to provide a safety device of the character aforesaid operative to prevent the tool carrying head of the machine from being set in motion except when a plate or other like article which is to be acted upon by the tool is disposed on the table of the machine substantially in shearing position.

The invention further contemplates the provision of a safety device for shearing or punching machines or the like which is of simple and rugged construction and entirely automatic in the performance of its intended functions, which may be easily installed on such machines and other substantially similar machines of the types commonly in use without material modification thereof and at relatively slight expense, and which when so installed requires practically no attention and is not liable to get out of order or become inoperative under the conditions of use to which machines of this class are ordinarily subjected.

The invention further includes other objects, advantages and novel features of design, construction and arrangement to which reference is more particularly made or which will be apparent from the following description of one embodiment of the invention as illustrated in the accompanying drawings.

As the invention particularly lends itself to installation upon and operative combination with shears adapted for shearing plates, sheets or similar articles, we have chosen to illustrate it in connection with a plate shear of well known form, and as the construction and operation of shears of this character are thoroughly familiar to those skilled in the art we have shown in the drawings in a somewhat conventional way only so much of the shear proper as is requisite for an adequate understanding of the invention.

In the said drawings Fig. 1 is a front view of the shear with the safety device operatively combined therewith and with a plate disposed on the shear table in position to be acted upon by the shear and Fig. 2 is an elevation of the left hand end of the shear shown in Fig. 1; in both of these views the shear blade is shown in raised or normal position. Fig. 3 is an enlarged fragmentary detail view, principally in vertical section, of the clutch mechanism and adjacent parts of the shear; Fig. 4 is an enlarged fragmentary detail view, partially in section, of a portion of the safety device apart from the shear and Fig. 5 is a diagrammatic view illustrating the electrical connections and mechanisms preferably employed in the device. The same symbols are used to designate the same parts in the several figures.

The particular plate shear shown comprises, generally speaking, a table 1 disposed in front of and between laterally spaced housings 2, 2 rising from a base 3 and connected at their upper extremities by a heavy yoke 4. Between the housings is arranged a tool carrying head or slide 5 vertically movable in ways formed in the housings and actuated by cranks 6 in conjunction with eccentrics disposed on the main operating shaft 7 extending horizontally through and journaled in the housings above the head. This shaft through suitable clutch mechanism hereinafter more particularly described may be operatively connected with a power shaft 8 carrying a driving gear 9 actuated from a motor 10 or other source of power through a gear train 11; the motor and train are not shown in the principal figures but are indicated in Fig. 5 and it will be understood they may be of any desired arrangement and construction effective to keep the power shaft 8 rotating continuously whenever the motor is in operation. The lower or stationary shear blade 12 is removably secured in horizontal transversely extending position adjacent the rear edge of the table and a complementary upper or movable shear blade 13 is similarly secured adjacent the lower edge of the head which is preferably angularly upwardly inclined from one end to the other so that as it descends from normal position and carries the upper blade over the adjacent face of the lower one, the overhanging end P' of a plate P disposed on the table will be progressively sheared from one lateral edge to the other. As plate shears of this general character are in common use and well understood by those familiar with the art further description would be superfluous.

It will of course be appreciated that when the power shaft 8 is disconnected from the operating shaft 7 no movement of the head 5 can take place but that when such connection is effected between the shafts through the medium of the clutch, the rotation of shaft 7 thus brought about is effective to reciprocate the head. The clutch is preferably so constructed that each time it is engaged one full revolution is imparted to the operating shaft with the result that if the head be in raised position at the commencement of the revolution of the shaft, it is given a full movement of reciprocation in both directions and thus returned to normal position simultaneously with the automatic disengagement of the clutch when the operating shaft has completed a full revolution.

While various types of clutches and clutch operating mechanism adapted for the performance of these functions are in use, one well known form thereof which we have chosen to illustrate comprises, as best shown in Fig. 3, a clutch-half 20 keyed to shaft 7 and carrying in a recess formed in its outer face a spring pressed pin 21 having a suitably beveled or tapered end. This pin is operative when projected out of its recess to engage in any one of a series of depressions 23 formed in a clutch plate 24 carried by the driving gear 9 so as to lock the clutch-half 20 to the plate and thus effect revolution of shaft 7. For disengaging the pin from the plate and thereafter holding it in its recess to maintain the clutch in disengaged condition, a dog 25 is disposed adjacent the forward end of an arm 26 carried by a lever 27 pivoted to the frame of the machine at 28; this dog has a suitably beveled face and, when the lever is raised, is adapted to enter between the clutch-half 20 and plate 24 and lie in the path of the pin as it is carried around when the clutch as a whole is rotating so that after the pin reaches the dog it rides up on the beveled face thereof and is thus forced out of engagement with plate 24 with resultant disengagement of the clutch, the dog thereafter operating to hold the pin in its recess as shown in Fig. 3 until it is moved away from the pin by actuation of lever 27. This movement of the lever is effected through the medium of a link 30 having in accordance with our invention a pin and slot connection 31 with an arm 32 disposed on a shaft 33 extending horizontally adjacent the base of the machine and also carrying operating pedals 34. Thus, when it is desired to engage the clutch, the operator by depressing one of the pedals 34 can move the link upwardly so as to rotate lever 27 on its fulcrum, after the lost motion permitted by the pin and slot connection 31 is taken up, and thereby withdraw dog 25 from between clutch-half 20 and plate 24 to permit pin 21 to move outwardly in its recess and enter one of the depressions in the plate which, with the gear 9, is constantly rotating. As soon as the clutch is thus engaged the operator removes his foot from the pedal which allows the dog to move upwardly into the path of the pin which, as the shaft 7 approaches completion of a full revolution, gradually rides up on the dog and is ultimately forced out of engagement with plate 24, thereby disengaging the clutch and returning the parts to the position shown in Fig. 3. Save for the use of the pin and slot, instead of a direct connection between link 30 and arm 32, the parts hitherto described are of usual and well known construction and operation.

In accordance with the present invention we dispose in front of the head 5 and upper blade 13 a vertically movable guard generally designated as 35 comprising a horizontally extending support 36, which for lightness and strength may be tubular, and depending portions 37 desirably of wire netting or the like carried on suitable frames suspended from the supports by clips or bands 38 through which the support extends in such manner that the depending portions will hang vertically from the supports and can swing about the latter, though in certain constructions it may be preferable to permanently secure the clips to the supports so as to hold the depending portions rigidly in substantially vertical position.

The guard is supported by a pair of laterally spaced substantially vertically extending tubes 40, 41 whose lower ends pass through bosses 36' in the supports and are welded or otherwise secured thereto. These tubes extend upwardly from the guard through guides 42 carried by the head 5 and near their upper ends are respectively provided with slots 40', 41' through which are extended the free forward ends of arms 43, 44 which are mounted on a shaft 45 journaled in brackets 46 extending rearwardly from the yoke 4 of the shear. To hold the tubes in proper position on the arms and form a sort of guide therefor, pins 43', 44' are extended through the arms on opposite sides of the adjacent tube, the respective pairs of pins being spaced apart sufficiently, however, to permit the arms to move freely in the slots in the tubes when the arms are oscillated through a limited arc as hereinafter described. Upon the shaft 45 adjacent the left hand end of the machine is also mounted a crank 47 connected by a link 48 with the rear end of the arm 32, a turn buckle 48' being desirably provided in the link to enable the convenient adjustment of its length. It will thus be apparent that when the pedals 34 are in normal or raised position as shown the forward or free ends of the arms 43, 44 will also be raised and the tubes 40, 41 suspended thereon through engagement of the upper ends of the slots in the tubes with the levers, thus in turn holding the tubes in raised position.

Disposed in the lower end of each tube is a contact point 50 insulated from the tube by an insulating bushing 51 and connected to an insulated wire running upwardly in the tube as best shown in Fig. 4 and brought out from the tube at any convenient point. The lower end of each contact point preferably extends a little below the edge of the depending portions of the guard 35 which, as best shown in said figure, are spaced apart to accommodate the contact points, so that when the guard is lowered the contact points will be first to strike a subjacent object.

Countersunk in the table of the machine flush with the surface thereof and in alignment with one of the contact points, for example, that carried by tube 40, is a block 52 of fibre or other insulating material against which when the guard is lowered the superjacent contact point will engage in the absence of a plate P or other article on the table in the path of the point.

It will thus be apparent that depression of either of the pedals 34 from raised or normal position is initially effective to move arms 43, 44 downward, thus allowing the guard 35 to descend by gravity as the tubes 40, 41 follow the arms, until one contact point strikes the fibre block 52 and the other strikes the table 1, assuming there is no plate in the latter, thus arresting further downward movement of the guard but the movement of the pedal requisite for accomplishing this result is insufficient to move the link 30 since the parts are so arranged and adjusted that during all or at least the major portion of the downward movement of the guard the pin 31' of the slot and pin connection 31 between the arm 32 and link 30 merely rises in the slot and is thus ineffective to move the link. However, about the time the guard reaches its lowermost position the pin reaches the upper end of the slot with the result that further depression of the pedal moves link 30 upward, thereby turning lever 27 on its pivot to withdraw dog 25 from between the members of the clutch and allow pin 21 to move outward to lock clutch-half 20 to the rotating gear 9, the arms 43, 44 during this further movement of the pedal merely traveling downward in the slots 40', 41' in the now stationary tubes to whatever extent may be required, the length of the slots being ample for this purpose.

In accordance with our invention means are provided for positively preventing engagement of the clutch until the guard has reached or substantially reached lowered position and the contact points are resting on a plate or other like article disposed upon the table of the machine beneath the guard; a preferred form of said means, which are both electrical and mechanical in character, will now be described.

Disposed on that housing of the shear adjacent the clutch or in any other convenient position is a bracket 60 carrying a solenoid 61 the plunger of which is connected with a toothed locking dog 62 pivoted to the bracket as at 63 and cooperative with a correspondingly toothed rack adjacent the lower end of a rod 64 vertically slidable through arms 60' with which the bracket is provided, the upper end of this rod being pivotally connected to the lever 27. A spring 65 is disposed adjacent dog 62 in such manner as to constantly force it toward the rod and engage its teeth with those of the latter when the solenoid is unenergized, thus preventing rod 64 from vertical movement and holding lever 27 in raised position, thereby maintaining dog 25 in position to hold pin 21 out of engagement with plate 24 on the driving gear. When, however, the solenoid is energized as hereinafter described, dog 62 is moved to the right in Fig. 1 so as to disengage its teeth from those on rod 64, thus unlocking lever 27 and permitting it to move downwardly to withdraw the dog 25 from pin-engaging position. Reference may now be had to Fig. 5 for an explanation of the electrical connections and mechanisms preferably employed and which, in addition to the solenoid 61, may comprise a relay 70 and two separate circuits now to be described. In the first or relay circuit which may desirably be of relatively low voltage a wire 71 extends from a suitable source of current through a switch 72 to the contact point 50 disposed at the lower end of tube 40; from the other contact point a wire 73 extends to the coil of the relay while another wire 74 from the latter, through switch 72, completes the circuit back to the source of current. In the second or solenoid circuit which may be of higher voltage, a wire 80 extends through a switch 81 from a suitable source of current to the solenoid 61; a wire 82 extends from the solenoid to the relay 70 and another wire 83 extends from the other side of the relay to the switch and thence completes the circuit to the source of current supply.

The operation of the invention when constructed and installed substantially as hereinbefore described will now be briefly explained: When, as shown, the movable tool carrying head 5, guard and operating pedals 34 are all in raised or normal position the dog 25 is so disposed as to hold pin 21 out of engagement with sliding gear 9 and thus maintain the clutch disengaged. Assuming the gear 9 is rotating and that a plate P disposed on the table of the shear has been advanced to shearing position in which its forward edge P' overhangs the stationary blade 12, the operator now depresses one of the pedals 34 which, as heretofore explained, is initially effective to move the guard down until the contact points 50 engage the surface of the plate, thus effecting a connection between the points through the medium of the plate itself and completing the circuit through the coil of relay 70 which immediately operates to close solenoid circuit with resultant energization of the solenoid 6'. Thus energized, the solenoid moves dog 62 away from rod 64 and unlocks lever 27 so that as the downward movement of pedal 34 is continued by the operator, lever 27 can rotate about its pivot to withdraw dog 25 from the path of pin 21 and permit engagement of the clutch, thereby initiating the downward movement of the head 5 carrying blade 13. Toward the completion of the shearing operation the operator removes his foot from the pedal which immediately returns to normal position, thus raising the guard, breaking the circuit between the points, deenergizing the solenoid, and also moving lever 27 to a position in which dog 25 is again interposed in the path of the pin as it moves around with the clutch; as shaft 7 approaches completion of a full revolution pin 21 begins to ride up on the dog as heretofore explained and as the shaft completes its revolution the pin is forced out of engagement with plate 24 by the dog so as to disengage the clutch and bring the parts to rest with the head in elevated position and the locking dog again locking rod 64 against movement.

It will be apparent from the foregoing that until the two contact points 50 are brought into engagement with plate P the circuits are kept open and the solenoid maintained in deenergized condition with the result that it is impossible to engage the clutch. Consequently, if the operator's hands are too close to the path of the shear blade when he depresses the operating pedal they will necessarily lie in the path of the guard and will be struck by the latter during its descent and before any movement of the blade, thus giving the operator a tangible and physical warning that his hands are in danger and, further, prevent the guard from descending sufficiently far to bring the contact points into engagement with the plate P until they are withdrawn from beneath the guard. Therefore, not only is a careless operator warned that his hands are in a dangerous position before any movement of the blade is initiated, but, additionally, any movement of the head and blade is positively prevented irrespective of the amount of pressure which he may apply to the operating pedal until his hands are completely withdrawn from the path of the guard so the latter can descend sufficiently to establish through the plate itself the circuit which is necessarily prerequisite to the engagement of the main clutch of the machine.

It will be further apparent that the presence of a plate in a position to be engaged by both contact points is required before any engagement of the clutch can be effected, for in the absence of the plate the contact point aligned with the insulating block 52 will merely engage the latter when the guard is fully lowered and no circuit will be established between the points. The employment of the block is therefore advantageous in that it tends to prevent unauthorized operation of the machine or its operation and consequent consumption of power when no plate is in position to be sheared, and also tends to minimize the chance of injury through accidental operation of the machine when making adjustments or the like.

The use of separate relay and solenoid circuits as herein explained is ordinarily deemed preferable by us since the use of current of relatively high voltage for operating the solenoid without danger to the operator of the machine is thereby permitted. Thus, for example, by the use of separate circuits as aforesaid, direct current at a voltage of 250 may be employed for the operation of the solenoid and alternating current at a voltage of 110 in the relay circuit, thus avoiding any chance of injury to the operator should he bring his hands into contact with any of the exposed parts of the latter such as the contact points. Under certain circumstances, however, it may be preferred to include both the solenoid and the contact points in a single circuit thus dispensing with the relay and the separate relay circuit and utilizing the same voltage between the contact points as in the solenoid.

While we have herein described and illustrated with considerable detail a preferred embodiment of our invention in operative association and combination with a plate shear of well known form and embodying a clutch of the type frequently employed, we do not thereby desire or intend to limit or confine the use of our invention to plate or other shears as the same is equally adapted for use in connection with punching or forming machines and in fact with any machine having a movable tool carrying head in proximity to which the operator's hands are necessarily more or less adjacent during the cycle of its operations, while, additionally, the details of design, construction and arrangement of the various parts of the specific mechanism employed in the practice of the invention may be modified in numerous particulars from the precise embodiments to which we have referred with a view to adapting the same for installation upon and operative association with machines of variant construction or for other purposes as may be desired, without departing from the spirit and scope of the invention as defined in the appended claims.

Having thus described our invention, we claim and desire to protect by Letters Patent of the United States:

1. In combination, a machine having a movable head, a clutch operative to control the movement of the head and a table adapted to receive an article to be operated on by the machine, an electrically conductive article, and a safety device comprising a movable guard, means for moving the guard to a point adjacent the table, and means operative to prevent engagement of the clutch to move the head save when said article is disposed on the table in the path of the guard.

2. In combination, a machine having a movable head, a clutch operative to control the movement of the head and a table adapted to receive the article to be acted on by the machine, an electrically conductive article, and a safety device comprising a vertically movable guard, means for lowering the guard to a point adjacent the table, means carried by the guard operative to contact with said article when disposed on the table beneath the guard, and means operative to prevent engagement of the clutch to move the head until after said contacting means are brought into engagement with said article.

3. The combination of a machine having a movable tool-carrying head, a clutch operative to control the movement of the head, means for engaging and disengaging the clutch and a table adapted to support an article to be acted on by a tool carried by the head, an electrically conductive article, and a safety device comprising a vertically movable guard disposed in front of the path of the head, means interconnected with said clutch operating means operative to move the guard toward the table, spaced contact points carried by the guard, and electrically releasable locking means operative to prevent engagement of the clutch until said contact points are brought into such engagement with said article when disposed on the table beneath the guard as to thereby establish a circuit through said article.

4. The combination of a machine having a movable tool-carrying head, a clutch operative to control the movement of the head, means for engaging and disengaging the clutch and a table adapted to support an article to be acted on by a tool carried by the head, an electrically conductive article, and a safety device comprising a vertically movable guard disposed in front of the head, means interconnected with said clutch engaging means operative to move the guard toward the table upon initial actuation of said clutch engaging means, spaced contact points carried by the guard, locking means adapted to normally prevent engagement of the clutch, and electrically actuated means operative to release said locking means to permit engagement of the clutch after said contact points are brought into contact with said article when disposed on the table beneath the guard and a circuit established through said article between said points.

5. The combination of a machine having a movable tool-carrying head, a clutch operative to control the movement of the head, means for engaging and disengaging the clutch and a table adapted to support an article to be acted on by a tool carried by the head, an electrically conductive article, and a safety device comprising a movable guard, means interconnected with the clutch engaging means for moving the guard, locking means for the clutch engaging means operative to normally maintain the clutch disengaged and electrically actuated means including spaced contact points carried by the guard operative to release said locking means to permit engagement of the clutch when a circuit is established between said points through said article when disposed on the table beneath the guard.

6. The combination of a machine having a movable tool-carrying head, a clutch operative to control the movement of the head, means for engaging and disengaging the clutch and a table adapted to support an article to be acted on by a tool carried by the head, an electrically conductive article, and a safety device comprising spaced contact points, means interconnected with the clutch engaging means for moving said points into contact with said article when disposed on the table to thereby establish a circuit between said points, locking means operative to normally prevent the engagement of the clutch, electrically actuated means operative to release said locking means when said circuit is established between the points, and means carried by the table adapted to prevent the establishment of said circuit in the absence of said article.

7. The combination of a machine having a movable tool-carrying head, a clutch operative to control the movement of the head, means for engaging and disengaging the clutch and a table adapted to support an article to be acted upon by a tool carried by the head, an electrically conductive article, and a safety device comprising a vertically movable guard disposed in front of the head above the table, a pair of spaced contact points carried by the guard and depending therebelow, means interconnected with the clutch engaging means adapted to lower the guard toward the table during the initial movement of said means to engage said points with said article when disposed thereon, means operative to prevent engagement of the clutch during said initial movement, and electrically operated means adapted to release said last mentioned means to permit engagement of the clutch during subsequent movement of the clutch operating means after the completion of a circuit between said points through the medium of said article.

8. In a safety device for a machine having a movable tool-carrying head, a pair of spaced contact points, a movable locking dog, means for normally holding the dog in locking position, a circuit including said contact points and normally interrupted between the latter, a solenoid connected with the locking dog whereby completion of the circuit between the contact points is operative to actuate the solenoid to move the locking dog from locking position and means, other than the locking dog, adapted to be maintained in non-operable condition when the locking dog is in locking position and operable to effect movement of the head when the locking dog is moved from locking position.

9. In combination a machine having a table, an electrically conductive article to be acted upon by the machine, and a safety device comprising a movable guard, a pair of spaced contact points movable with the guard, means for moving the guard, a movable locking dog, a circuit including said points and normally interrupted between the latter, a solenoid connected with the locking dog and operable to withdraw the dog from locking position, and means for normally holding the dog in locking position when said circuit is open, whereby upon closing of the circuit by a movement of the guard operative to engage said points with said article when disposed on the said table the solenoid is energized to move the dog from locking position.

In witness whereof, we have hereunto set our hands this 21st day of May, 1928.

CHARLES CARROLL.
JESSIE SHERMAN HOGUE.